US009007970B2

(12) United States Patent
Bengtsson

(10) Patent No.: US 9,007,970 B2
(45) Date of Patent: Apr. 14, 2015

(54) ANTENNA SWAPPING METHODS INCLUDING REPEATEDLY SWAPPING BETWEEN ANTENNAS, AND RELATED WIRELESS ELECTRONIC DEVICES

(71) Applicant: Sony Mobile Communications AB, Lund (SE)

(72) Inventor: Erik Bengtsson, Lund (SE)

(73) Assignees: Sony Corporation, Tokyo (JP); Sony Mobile Communications AB, Lund (SE)

( * ) Notice: Subject to any disclaimer, the term of this patent is extended or adjusted under 35 U.S.C. 154(b) by 229 days.

(21) Appl. No.: 13/649,385

(22) Filed: Oct. 11, 2012

(65) Prior Publication Data
US 2014/0105204 A1 Apr. 17, 2014

(51) Int. Cl.
H04B 7/00 (2006.01)
H04L 1/00 (2006.01)

(52) U.S. Cl.
CPC .................................. *H04L 1/0027* (2013.01)

(58) Field of Classification Search
USPC .................................. 370/252, 254, 310–350
See application file for complete search history.

(56) References Cited

U.S. PATENT DOCUMENTS

| 7,289,828 | B2 * | 10/2007 | Cha et al. ................... 455/562.1 |
| 7,702,298 | B2 * | 4/2010 | Barratt et al. ................ 455/101 |
| 2004/0033787 | A1 | 2/2004 | Weber et al. | |
| 2009/0046030 | A1 | 2/2009 | Song et al. | |
| 2010/0022192 | A1 | 1/2010 | Knudsen et al. | |
| 2012/0115553 | A1 * | 5/2012 | Mahe et al. ................. 455/575.7 |
| 2012/0281553 | A1 * | 11/2012 | Mujtaba et al. ............... 370/252 |
| 2013/0033996 | A1 * | 2/2013 | Song et al. .................... 370/252 |

FOREIGN PATENT DOCUMENTS

| EP | 0 364 190 | A2 | 4/1990 |
| EP | 0 889 603 | A2 | 1/1999 |
| EP | 1 928 107 | A1 | 6/2008 |
| EP | 2 180 603 | A1 | 4/2010 |

OTHER PUBLICATIONS

International Search Report Corresponding to International Application No. PCT/IB2012/000604; Date of Mailing: Oct. 16, 2012; 14 Pages.

(Continued)

*Primary Examiner* — Kwang B Yao
*Assistant Examiner* — Juvena Loo
(74) *Attorney, Agent, or Firm* — Myers Bigel Sibley & Sajovec, PA

(57) ABSTRACT

Antenna swapping methods for a wireless electronic device may include repeatedly swapping back and forth between activating a first antenna and activating a second antenna, and measuring an antenna performance characteristic of the wireless electronic device, during a time period of repeated swapping. The methods may include comparing the antenna performance characteristic of the wireless electronic device during the time period of repeated swapping and an antenna performance characteristic of the wireless electronic device before the time period of repeated swapping. The methods may include, in response to determining that the antenna performance characteristic of the wireless electronic device during the time period of repeated swapping is stronger than the antenna performance characteristic of the wireless electronic device before the time period of repeated swapping, swapping once between the first and second antennas. Related devices are also described.

21 Claims, 13 Drawing Sheets

(56) References Cited

OTHER PUBLICATIONS

European Search Report Corresponding to European Application No. 13183927.6; Dated: Jan. 8, 2014; 9 Pages.

Notification Concerning Transmittal of International Preliminary Report on Patentability in corresponding PCT Application No. PCT/IB2012/000604 mailed Oct. 2, 2014 (10 pages).

* cited by examiner

ANTENNA SWAPPING METHODS INCLUDING REPEATEDLY SWAPPING BETWEEN ANTENNAS, AND RELATED WIRELESS ELECTRONIC DEVICES

FIELD

The present inventive concepts generally relate to the field of communications and, more particularly, to antennas and wireless electronic devices incorporating the same.

BACKGROUND

Wireless electronic devices may include a greater number of antennas than active transceivers. Accordingly, a given wireless electronic device may swap from using one antenna with an active transceiver to using a different antenna with the active transceiver. Swapping between the antennas, however, may risk decreasing communications quality because the wireless electronic device may swap to a worse-performing antenna in some cases.

SUMMARY

Various embodiments of the present inventive concepts include antenna swapping methods for a wireless electronic device. The antenna swapping methods may include repeatedly swapping back and forth between activating a first antenna and activating a second antenna, and measuring an antenna performance characteristic of the wireless electronic device, during a time period of repeated swapping. The antenna swapping methods may include comparing the antenna performance characteristic of the wireless electronic device during the time period of repeated swapping and an antenna performance characteristic of the wireless electronic device before the time period of repeated swapping. The antenna swapping methods may include, in response to determining that the antenna performance characteristic of the wireless electronic device during the time period of repeated swapping is stronger than the antenna performance characteristic of the wireless electronic device before the time period of repeated swapping, swapping once between the first and second antennas.

In various embodiments, repeatedly swapping back and forth between activating the first antenna and activating the second antenna may include a plurality of swaps for antenna evaluation purposes during the time period of repeated swapping, and may be more temporary than the swapping once.

According to various embodiments, repeatedly swapping back and forth between activating the first antenna and activating the second antenna may include continuously swapping back and forth between activating the first antenna and activating the second antenna during the time period of repeated swapping such that the first and second antennas are alternately active during/within adjacent time slots, respectively.

In various embodiments, the swapping once may include swapping between the first and second antennas to maintain one of the first and second antennas as an active antenna continuously for a plurality of contiguous time slots.

According to various embodiments, repeatedly swapping back and forth between activating the first antenna and activating the second antenna may include repeatedly swapping back and forth between activating the first antenna and activating the second antenna in response to detecting weak signal conditions.

In various embodiments, detecting the weak signal conditions may include detecting and/or using a Single Input Single Output (SISO) mode and/or a Global System for Mobile Communications (GSM)/2 G mode for communications of the wireless electronic device.

According to various embodiments, the wireless electronic device may include a main signal path including uplink and downlink signal paths that are configured for transmissions through the first and second antennas, and a diversity signal path that configured is for downlink signals only. In some embodiments, communications using the diversity signal path may be disabled in response to the SISO mode and/or the GSM/2 G mode.

In various embodiments, repeatedly swapping back and forth between activating the first antenna and activating the second antenna may include repeatedly swapping back and forth between connecting the first antenna to the main signal path, together with disconnecting the second antenna from the main signal path, and connecting the second antenna to the main signal path, together with disconnecting the first antenna from the main signal path.

According to various embodiments, comparing the antenna performance characteristic of the wireless electronic device during the time period of repeated swapping and the antenna performance characteristic of the wireless electronic device before the time period of repeated swapping may include comparing a signal quality measurement of the wireless electronic device during the time period of repeated swapping and a signal quality measurement of the wireless electronic device before the time period of repeated swapping.

In various embodiments, the signal quality measurement of the wireless electronic device during the time period of repeated swapping may include an average of signal quality when the first antenna is active and signal quality when the second antenna is active. Alternatively, the signal quality measurement of the wireless electronic device during the time period of repeated swapping may be a measurement that ignores (e.g., excludes) the signal quality of the one of the first and second antennas that was active immediately before repeatedly swapping back and forth between activating the first antenna and activating the second antenna. In some embodiments, the signal quality measurement of the wireless electronic device before the time period of repeated swapping may include a stored value of signal quality of the one of the first and second antennas that was active immediately before repeatedly swapping back and forth between activating the first antenna and activating the second antenna.

Wireless electronic devices according to various embodiments may include first and second antennas connected to a multi-band transceiver circuit configured to provide communications for the wireless electronic devices via a plurality of frequency bands. The first and second antennas may be configured to connect to the multi-band transceiver circuit via main and diversity signal paths. The wireless electronic devices may include a controller configured to control repeatedly swapping back and forth between activating the first antenna and activating the second antenna, and configured to control measuring an antenna performance characteristic of the a particular one of the wireless electronic devices, during a time period of repeated swapping. The controller may be configured to compare the antenna performance characteristic of the particular one of the wireless electronic devices during the time period of repeated swapping and an antenna performance characteristic of the particular one of the wireless electronic devices before the time period of repeated swapping. The controller may be configured to control swapping once between the first and second antennas in response to determining that the antenna performance characteristic of the particular one of the wireless electronic devices during the time period of repeated swapping is stronger than the antenna performance characteristic of the particular one of the wireless electronic devices before the time period of repeated swapping.

In various embodiments, the main signal path may provide a path for both uplink and downlink signals, whereas the diversity signal path may provide a path for downlink signals only.

According to various embodiments, the first and second antennas may include redundant antennas with respect to each other for the main signal path.

In various embodiments, the controller may be configured to command a multiplexer connected between the main and diversity signal paths and the first and second antennas to switch which of the first and second antennas is connected to the main signal path.

According to various embodiments, the wireless electronic devices may include a non-transitory storage medium that stores an antenna swapping algorithm. The controller may be configured to control input of the antenna performance characteristic of the a particular one of the wireless electronic devices during the time period of repeated swapping and the antenna performance characteristic of the particular one of the wireless electronic devices before the time period of repeated swapping into the antenna swapping algorithm. The controller may be configured to control input of an output of the antenna swapping algorithm into the multiplexer to switch which of the first and second antennas is connected to the main signal path.

In various embodiments, the wireless electronic devices may include a third antenna connected to the multiplexer. The controller may be configured to command the multiplexer to connect one of the first, second, and third antennas to the main signal path. The controller may be configured to command the multiplexer to disconnect another one of the first, second, and third antennas from the main signal path.

According to various embodiments, repeatedly swapping back and forth between activating the first antenna and activating the second antenna may include continuously swapping back and forth between activating the first antenna and activating the second antenna during the time period of repeated swapping such that the first and second antennas are alternately active during/within adjacent time slots, respectively. The swapping once may include swapping between the first and second antennas to maintain one of the first and second antennas as an active antenna continuously for a plurality of contiguous time slots. The time period of repeated swapping may include a time period ranging from about 100.0 milliseconds to about 2.0 seconds. The controller may be configured to maintain the one of the first and second antennas after the swapping once for at least about 5.0 seconds In various embodiments, repeatedly swapping back and forth between activating the first antenna and activating the second antenna may include repeatedly swapping back and forth between activating the first antenna and activating the second antenna in response to detecting weak signal conditions.

According to various embodiments, detecting the weak signal conditions may include detecting and/or using a Single Input Single Output (SISO) mode and/or a Global System for Mobile Communications (GSM)/2 G mode for communications of a particular one of the wireless electronic devices.

Antenna swapping methods according to various embodiments are provided herein. The antenna swapping methods may be for (e.g., performed within) a wireless electronic device having multiple radio frequency signal paths (e.g., a main signal path and a secondary/diversity signal path). The antenna swapping methods may include using an algorithm to repeatedly switch between activating a first antenna and activating a second antenna, by transmitting and/or receiving signals using one of the radio frequency signal paths, during a time period of repeated swapping, to measure performance of at least one of the first and second antennas before activating a better-performing one of the first and second antennas for a time period that is longer than the time period of repeated swapping. Moreover, it will be understood that two or more of the radio frequency signal paths in the wireless electronic device may be active (e.g., used for transmitting/receiving signals with a network) in some embodiments. Accordingly, measuring performance of "first and second antennas" as described herein may include measuring/comparing performance of first and second antenna configurations (e.g., first and second pairs of antennas). Furthermore, after the time period of repeated swapping, one or both antennas in an antenna pair may be swapped out to provide a better-performing antenna configuration. In some embodiments, a best-performing antenna (among two or more antennas) in the wireless electronic device may be actively used with (e.g., communicating signals with a network via) the main signal path, and a second-best-performing antenna may be actively used with the secondary/diversity signal path.

Other devices and/or operations according to embodiments of the inventive concepts will be or become apparent to one with skill in the art upon review of the following drawings and detailed description. It is intended that all such additional devices and/or operations be included within this description, be within the scope of the present inventive concepts, and be protected by the accompanying claims. Moreover, it is intended that all embodiments disclosed herein can be implemented separately or combined in any way and/or combination.

DETAILED DESCRIPTION OF EMBODIMENTS

Figure 1:
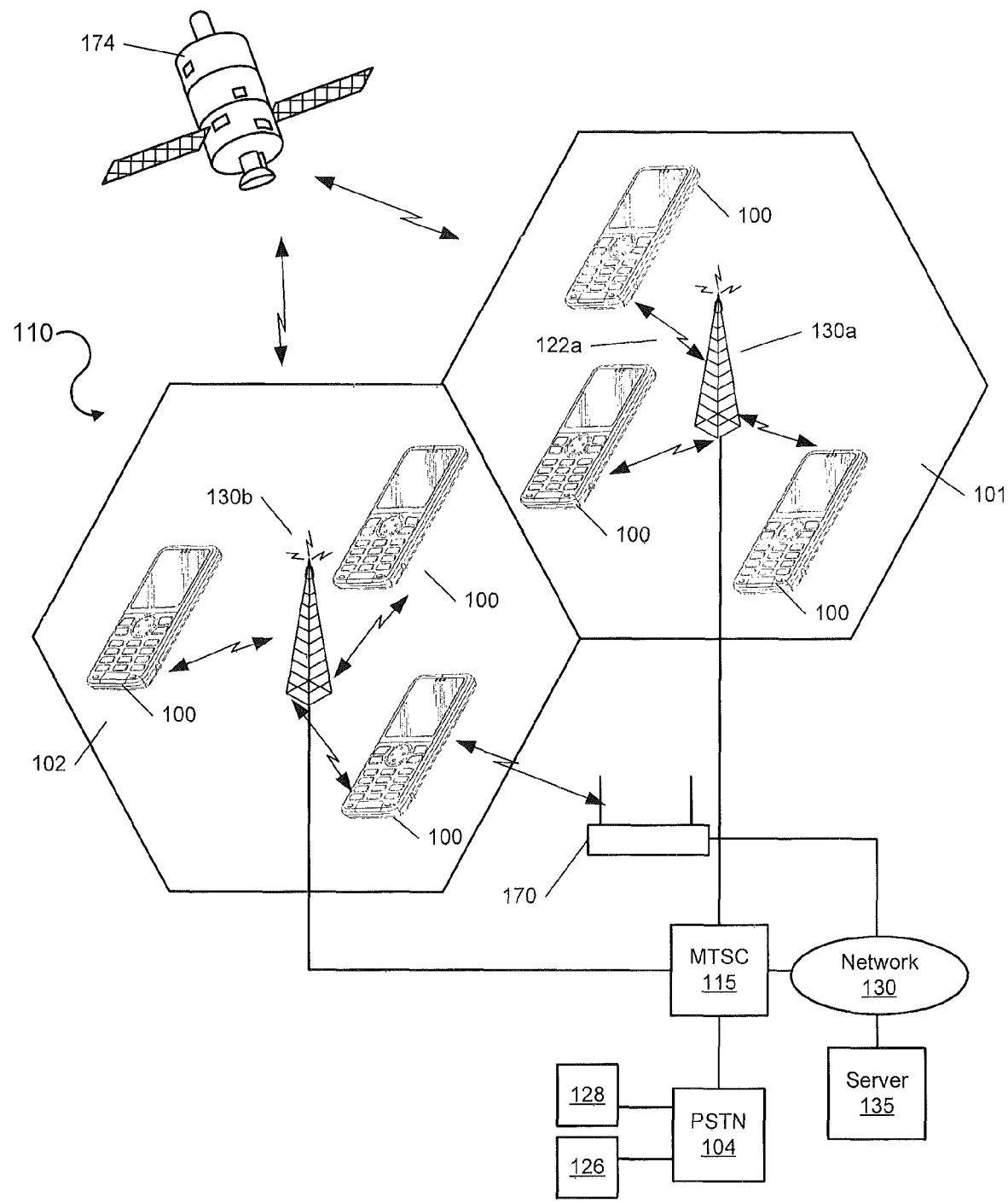
FIG. 1 is a schematic illustration of a wireless communications network that provides service to wireless electronic devices, according to various embodiments of the present inventive concepts.

The present inventive concepts now will be described more fully with reference to the accompanying drawings, in which embodiments of the inventive concepts are shown. However, the present application should not be construed as limited to the embodiments set forth herein. Rather, these embodiments are provided so that this disclosure will be thorough and complete, and to fully convey the scope of the embodiments to those skilled in the art. Like reference numbers refer to like elements throughout.

The terminology used herein is for the purpose of describing particular embodiments only and is not intended to be limiting of the embodiments. As used herein, the singular forms "a," "an," and "the" are intended to include the plural forms as well, unless the context clearly indicates otherwise. It will be further understood that the terms "comprises," "comprising," "includes," and/or "including," when used herein, specify the presence of stated features, steps, operations, elements, and/or components, but do not preclude the presence or addition of one or more other features, steps, operations, elements, components, and/or groups thereof.

It will be understood that when an element is referred to as being "coupled," "connected," or "responsive" to another element, it can be directly coupled, connected, or responsive to the other element, or intervening elements may also be present. In contrast, when an element is referred to as being "directly coupled," "directly connected," or "directly responsive" to another element, there are no intervening elements present. As used herein the term "and/or" includes any and all combinations of one or more of the associated listed items.

Spatially relative terms, such as "above," "below," "upper," "lower," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly. Well-known functions or constructions may not be described in detail for brevity and/or clarity.

It will be understood that, although the terms "first," "second," etc. may be used herein to describe various elements, these elements should not be limited by these terms. These terms are only used to distinguish one element from another. Thus, a first element could be termed a second element without departing from the teachings of the present embodiments.

Unless otherwise defined, all terms (including technical and scientific terms) used herein have the same meaning as commonly understood by one of ordinary skill in the art to which these embodiments belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

It is to be understood that the functions/acts indicated in the illustrated blocks may occur out of the order noted in the operational illustrations. For example, two blocks shown in succession may in fact be executed substantially concurrently or the blocks may sometimes be executed in the reverse order, depending upon the functionality/acts involved.

For purposes of illustration and explanation only, various embodiments of the present inventive concepts are described herein in the context of "wireless electronic devices." Among other devices/systems, wireless electronic devices may include multi-band wireless communication terminals (e.g., portable electronic devices/wireless terminals/mobile terminals/terminals) that are configured to carry out cellular communications (e.g., cellular voice and/or data communications) in more than one frequency band. It will be understood, however, that the present inventive concepts are not limited to such embodiments and may be embodied generally in any device and/or system that is configured to transmit and receive in two or more frequency bands. The term "activating," as used herein with respect to a particular antenna, may refer to transceiving (transmitting and/or receiving) using the particular antenna. Moreover, it will be understood that the terms "swap" and "swapping," as used herein, may include switching, changing, or selecting between different antennas of a device and/or system. As used herein, the term "about" means that the recited number or value can vary by twenty percent (20%).

Given relatively weak signal conditions, a secondary receiver (e.g., including a diversity receiver/signal path) of a wireless electronic device may be disabled/off. An example of relatively weak signal conditions is when the wireless electronic device is connected to a 2 G network such as a Global Standard for Mobile (GSM)/General Packet Radio Service (GPRS)/enhanced data rates for GSM evolution (EDGE) network. In particular, the wireless electronic device may be operating in a Single Input Single Output (SISO) mode in which only one antenna is being used via a primary receiver, even though multiple antennas are available in the wireless electronic device. The antenna that is currently being used by the primary receiver, however, may provide worse performance than an antenna that is not being used, and a swap to the unused antenna may thus improve performance. Moreover, it will be understood that three or more antennas may be available in a wireless electronic device in some embodiments, such as in a wireless electronic device configured to communicate with an LTE network. In particular, in any wireless electronic device that has antenna redundancy (i.e., more antennas than receivers or transmitters for communicating downlink or uplink signals, respectively), it may be desirable to swap to an unused antenna.

For example, a hand of a user of a wireless electronic device may touch a first antenna (or the first antenna may otherwise be loaded), and may cause a performance decrease (e.g., as measured by received signal strength) that is significant enough to warrant swapping from the first antenna to a second antenna that is not currently being used by a primary receiver. Connection quality between the wireless electronic device and a network thus may improve if the wireless electronic device swaps from the first antenna to the second antenna. Moreover, because a power amplifier of the wireless electronic device may operate at a relatively high power level (and thus consume a relatively large amount of current) during weak signal conditions, swapping to the better-performing second antenna may save power for the wireless electronic device.

Because a secondary receiver of a wireless electronic device may be turned off under 2 G/SISO conditions, however, it may be difficult to efficiently swap between antennas. For example, although it may be possible to enable the secondary receiver temporarily to test an antenna connected thereto to determine whether swapping between antennas would improve performance, enabling the secondary receiver may be complicated under 2 G/SISO conditions. In another example, although it may be possible to blindly swap between antennas without first testing to determine whether the swap would improve performance, blindly swapping between antennas may result in swapping to a worse-performing antenna. In particular, if a user of the wireless electronic device is using the wireless electronic device for a phone call when the wireless electronic device swaps to a worse-performing antenna, then a potential risk is that the worse antenna performance will be sufficiently weak to drop the phone call entirely.

Various embodiments of the operations and related wireless electronic devices described herein, however, may repeatedly alternate/swap between antennas for a short time period to determine whether a more permanent swap between the antennas would improve performance. In particular, a wireless electronic device may alternate/swap between the antennas with sufficient speed to provide a low risk of a lost communications connection (e.g., a dropped phone call) that may otherwise result from swapping to a worse-performing antenna. Moreover, repeatedly swapping/alternating between the antennas may allow the wireless electronic device to measure antenna performance during the repeated swapping/alternating to easily determine whether a more permanent swap between the antennas would improve or decrease performance.

Referring to FIG. 1, a diagram is provided of a wireless communications network 110 that supports communications in which wireless electronic devices 100 can be used according to various embodiments of the present inventive concepts. The network 110 includes cells 101, 102 and base stations 130a, 130b in the respective cells 101, 102. Networks 110 are commonly employed to provide voice and data communications to subscribers using various radio access standards/technologies. The network 110 may include wireless electronic devices 100 that may communicate with the base stations 130a, 130b. The wireless electronic devices 100 in the network 110 may also communicate with a Global Positioning System (GPS) 174, a local wireless network 170, a Mobile Telephone Switching Center (MTSC) 115, and/or a Public Service Telephone Network (PSTN) 104 (i.e., a "landline" network).

The wireless electronic devices 100 can communicate with each other via the Mobile Telephone Switching Center (MTSC) 115. The wireless electronic devices 100 can also communicate with other devices/terminals, such as terminals 126, 128, via the PSTN 104 that is coupled to the network 110. As also shown in FIG. 1, the MTSC 115 is coupled to a computer server 135 via a network 130, such as the Internet.

The network 110 is organized as cells 101, 102 that collectively can provide service to a broader geographic region. In particular, each of the cells 101, 102 can provide service to associated sub-regions (e.g., the hexagonal areas illustrated by the cells 101, 102 in FIG. 1) included in the broader geographic region covered by the network 110. More or fewer cells can be included in the network 110, and the coverage area for the cells 101, 102 may overlap. The shape of the coverage area for each of the cells 101, 102 may be different from one cell to another and is not limited to the hexagonal shapes illustrated in FIG. 1. Each of the cells 101, 102 may include an associated base station 130a, 130b. The base stations 130a, 130b can provide wireless communications between each other and the wireless electronic devices 100 in the associated geographic region covered by the network 110.

Each of the base stations 130a, 130b can transmit/receive data to/from the wireless electronic devices 100 over an associated control channel. For example, the base station 130a in cell 101 can communicate with one of the wireless electronic devices 100 in cell 101 over the control channel 122a. The control channel 122a can be used, for example, to page the wireless electronic device 100 in response to calls directed thereto or to transmit traffic channel assignments to the wireless electronic device 100 over which a call associated therewith is to be conducted.

The wireless electronic devices 100 may also be capable of receiving messages from the network 110 over the respective control channel 122a. In various embodiments according to the inventive concepts, the wireless electronic devices 100 receive Short Message Service (SMS), Enhanced Message Service (EMS), Multimedia Message Service (MMS), and/or Smartmessaging™ formatted messages.

The GPS 174 can provide GPS information to the geographic region including cells 101, 102 so that the wireless electronic devices 100 may determine location information. The network 110 may also provide network location information as the basis for the location information applied by the wireless electronic devices 100. In addition, the location information may be provided directly to the server 135 rather than to the wireless electronic devices 100 and then to the server 135. Additionally or alternatively, the wireless electronic devices 100 may communicate with the local wireless network 170.

Figure 2A:
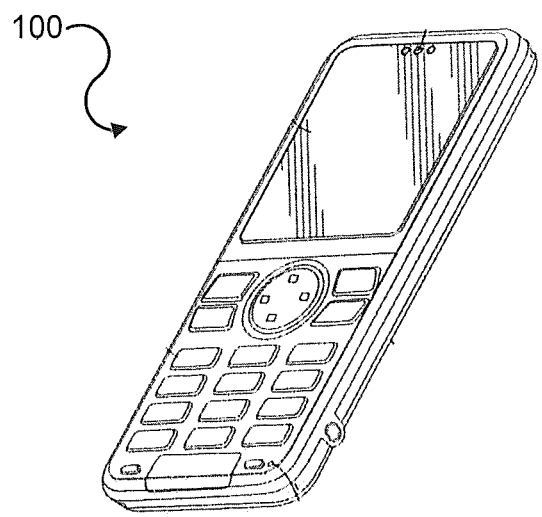
FIGS. 2A and 2B illustrate front and rear views, respectively, of a wireless electronic device, according to various embodiments of the present inventive concepts.
Figure 2B:
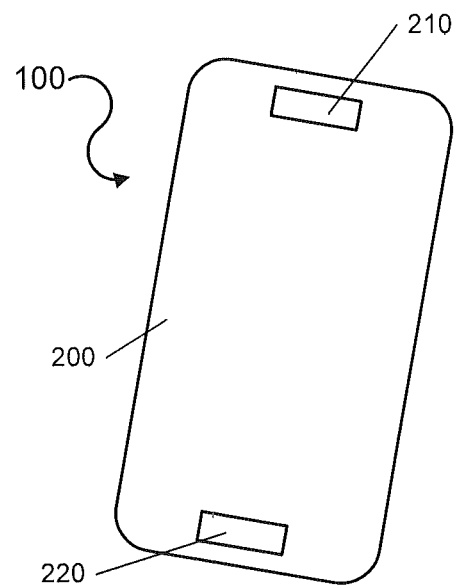

FIGS. 2A and 2B illustrate front and rear views, respectively, of a wireless electronic device 100, according to various embodiments of the present inventive concepts. Accordingly, FIGS. 2A and 2B illustrate opposite sides of the wireless electronic device 100. In particular, FIG. 2B illustrates an external face 200 of a backplate of the wireless electronic device 100. Accordingly, the external face 200 of the backplate may be visible to, and/or in contact with, the user of the wireless electronic device 100. In contrast, an internal face of the backplate may face internal portions of the wireless electronic device 100, such as a transceiver circuit.

FIG. 2B further illustrates a first antenna 210 on one end of the wireless electronic device 100, a second antenna 220 on another end of the wireless electronic device 100. It will be understood, however, that the wireless electronic device 100 may include more than two antennas, and/or that the antennas 210, 220 may be arranged at various locations of the wireless electronic device 100. The antennas 210, 220 may be antennas configured for wireless communications. For example, at least one of the antennas 210, 220 may be a monopole antenna or a planar inverted-F antenna (PIFA), among others. Additionally, at least one of the antennas 210, 220 may be a multi-band antenna and/or may be configured to communicate cellular and/or non-cellular frequencies. Moreover, according to various embodiments, each of the antennas 210, 220 may be designed to cover all frequency bands of interest to the wireless electronic device 100, and each may be configured to transmit at full power and/or reduced power levels.

Figure 3A:
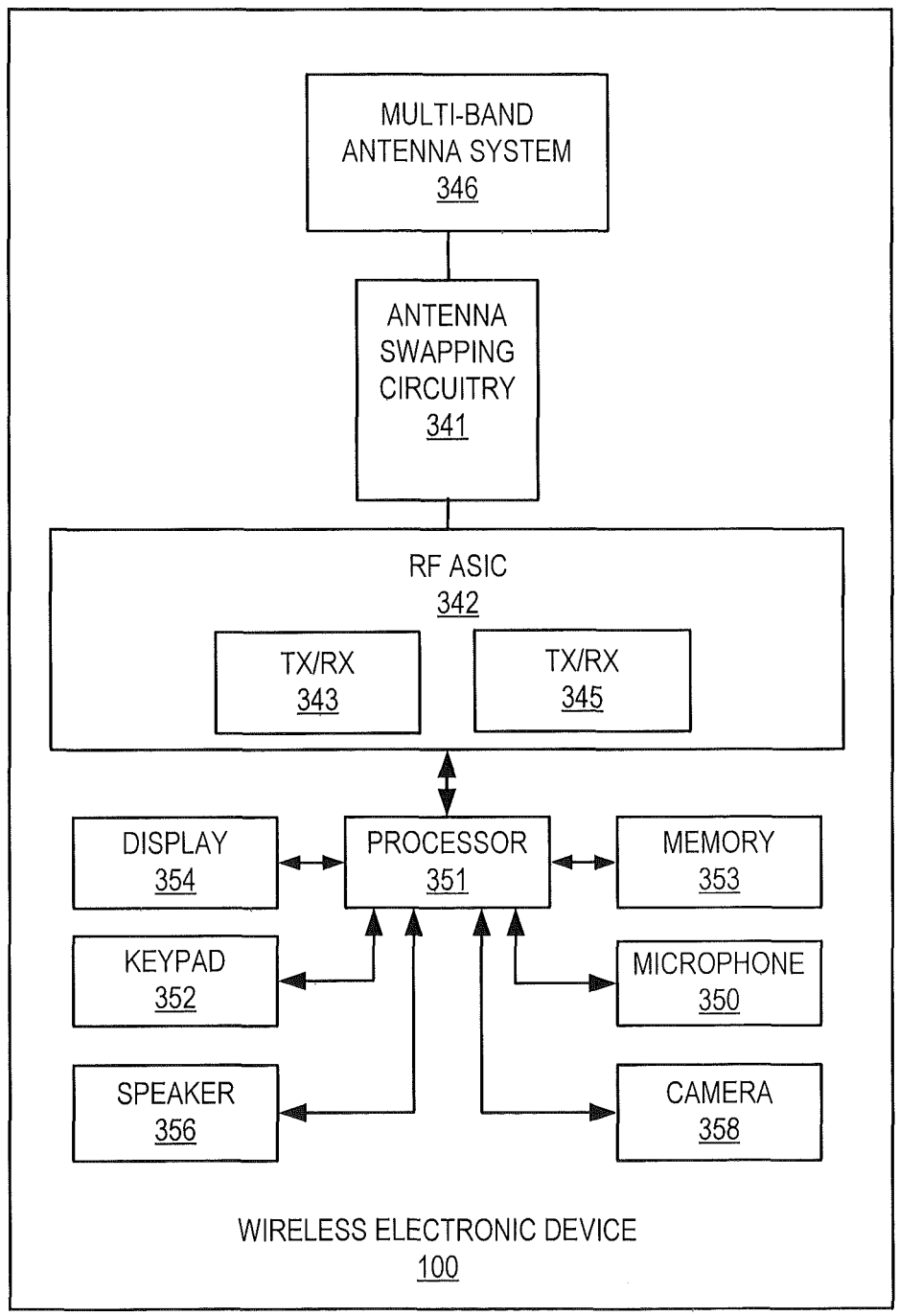
FIGS. 3A and 3B are block diagrams illustrating a wireless electronic device, according to various embodiments of the present inventive concepts.
Figure 3B:
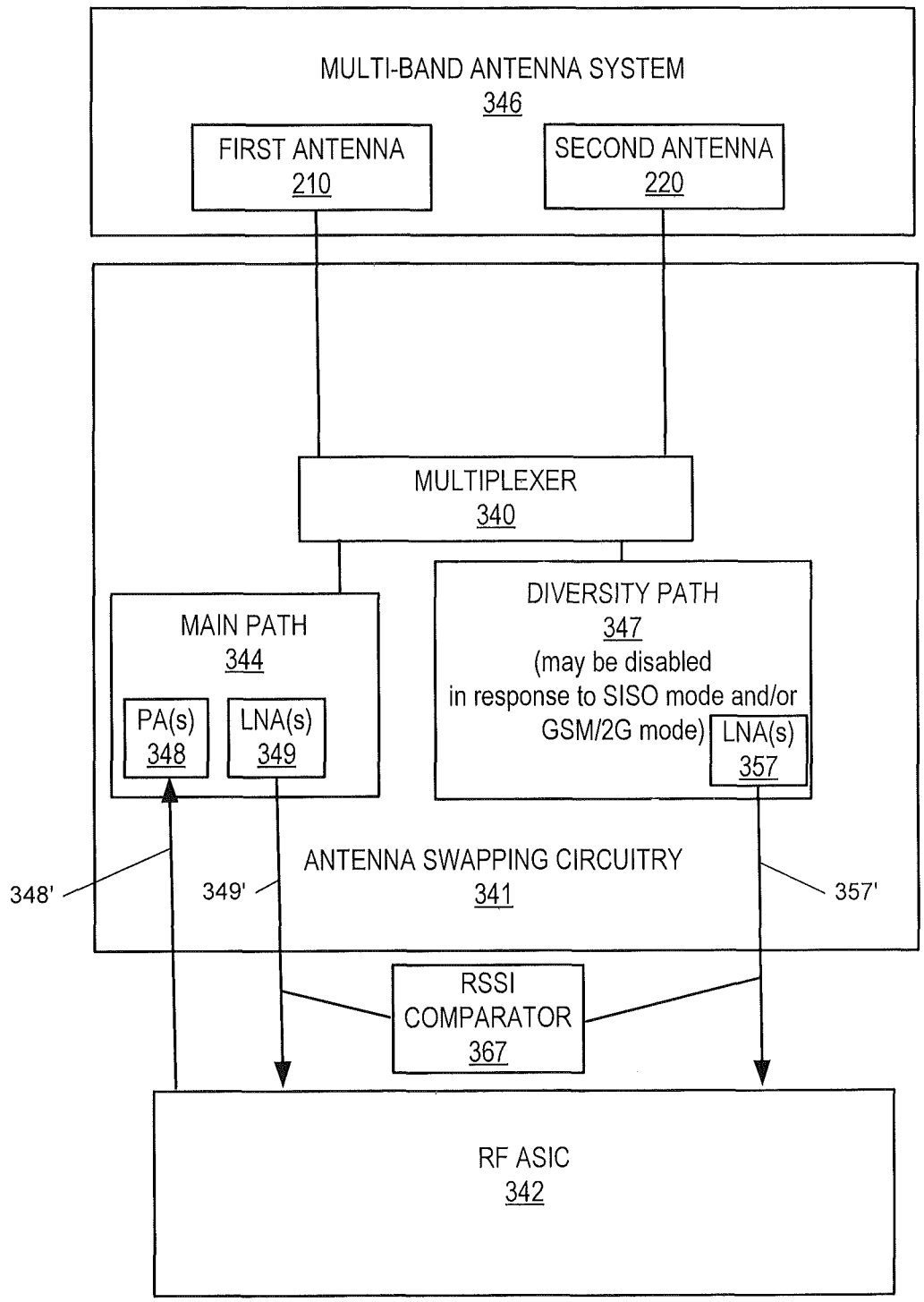

Referring now to FIGS. 3A and 3B, block diagrams are provided illustrating a wireless electronic device 100, according to various embodiments of the present inventive concepts. As illustrated in FIG. 3A, a wireless electronic device 100 may include a multi-band antenna system 346, antenna swapping circuitry 341, a Radio Frequency (RF) Application Specific Integrated Circuit (ASIC) (including, e.g., a transceiver) 342, and a processor 351. The wireless electronic device 100 may further include a display 354, keypad 352, speaker 356, memory 353, microphone 350, and/or camera 358. The antenna swapping circuitry 341 is connected between the multi-band antenna system 346 and the RF ASIC 342 of the wireless electronic device 100 such that it can provide swapping between different antennas in the multi-band antenna system 346 for active use (e.g., for transmitting and/or receiving communications). For example, different antennas in the multi-band antenna system 346 may communicate with the network 110 illustrated in FIG. 1.

The RF ASIC 342 may include transmit/receive circuitry (TX/RX) that provides separate communication paths for supplying/receiving RF signals to different radiating elements of the multi-band antenna system 346 via their respective RF feeds. Accordingly, when the multi-band antenna system 346 includes two active antenna elements (e.g., the antennas 210, 220), the RF ASIC 342 may include two transmit/receive circuits 343, 345 connected to different ones of the antenna elements via the respective RF feeds.

The RF ASIC 342, in operational cooperation with the processor 351, may be configured to communicate according to at least one radio access technology in two or more frequency ranges. The at least one radio access technology may include, but is not limited to, WLAN (e.g., 802.11), WiMAX (Worldwide Interoperability for Microwave Access), TransferJet, 3GPP LTE (3rd Generation Partnership Project Long Term Evolution), 4 G, Time Division LTE (TD LTE), Universal Mobile Telecommunications System (UMTS), Global Standard for Mobile (GSM) communication, General Packet Radio Service (GPRS), enhanced data rates for GSM evolution (EDGE), DCS, PDC, PCS, Code Division Multiple Access (CDMA), wideband-CDMA, and/or CDMA2000. The radio access technology may operate using such frequency bands as 700-800 Megahertz (MHz), 824-894 MHz, 880-960 MHz, 1710-1880 MHz, 1820-1990 MHz, 1920-2170 MHz, 2300-2400 MHz, and 2500-2700 MHz. Other radio access technologies and/or frequency bands can also be used in embodiments according to the inventive concepts. Various embodiments may provide coverage for non-cellular frequency bands such as Global Positioning System (GPS), Wireless Local Area Network (WLAN), and/or Bluetooth frequency bands. As an example, in various embodiments according to the inventive concepts, the local wireless network 170 (illustrated in FIG. 1) is a WLAN compliant network. In various other embodiments according to the inventive concepts, the local wireless network 170 is a Bluetooth compliant interface.

A transmitter portion of a transceiver of the RF ASIC 342 converts information, which is to be transmitted by the wireless electronic device 100, into electromagnetic signals suitable for radio communications. A receiver portion of the transceiver of the RF ASIC 342 demodulates electromagnetic signals, which are received by the wireless electronic device 100 from the network 110 (illustrated in FIG. 1) to provide the information contained in the signals in a format understandable to a user of the wireless electronic device 100.

The wireless electronic device 100 is not limited to any particular combination/arrangement of the keypad 352 and the display 354. As an example, it will be understood that the functions of the keypad 352 and the display 354 can be provided by a touch screen through which a user can view information, such as computer displayable documents, provide input thereto, and otherwise control the wireless electronic device 100. Additionally or alternatively, the wireless electronic device 100 may include a separate keypad 352 and display 354.

Referring still to FIG. 3A, the memory 353 can store computer program instructions that, when executed by the processor circuit 351, carry out the operations described herein and shown in the figures. As an example, the memory 353 can be non-volatile memory, such as EEPROM (e.g., flash memory), that retains stored data while power is removed from the memory 353.

Referring now to FIG. 3B, a block diagram is provided for the antenna swapping/matching circuitry 341 of the wireless electronic device 100. According to various embodiments, the antenna swapping/matching circuitry 341 of the wireless electronic device 100 may include a multiplexer 340 connected to both a main signal path 344 and a diversity signal path 347, such that the multiplexer 340 connects one of first and second antennas 210, 220 to the main signal path 344, and the other one of the first and second antennas 210, 220 to the diversity signal path 347. When the wireless electronic device 100 is communicating using a SISO mode and/or a GSM/2 G mode, however, communications using the diversity signal path 347 may be disabled. Accordingly, the one of first and second antennas 210, 220 that is not connected to the main signal path 344 may be referred to as a redundant antenna. Moreover, it will be understood that the transmit/receive circuits 343, 345 of FIG. 3A may be connected to the main signal path 344 and the diversity signal path 347, respectively. Disabling communications via the diversity signal path 347 may thus include disabling communications via the transmit/receive circuit 345. Alternatively, it will be understood that, in some embodiments, the swapping operations described herein may be performed when two or more radio frequency signal paths (e.g., the main signal path 344 and the diversity signal path 347 and/or another/a secondary signal path) in the wireless electronic device 100 are active. Accordingly, the swapping operations described herein may include measuring performance of, and swapping between, different combinations/configurations (e.g., pairs, etc.) of antennas connected to the radio frequency signal paths.

The main signal path 344 may provide paths for both uplink and downlink signals, whereas the diversity signal path 347 may provide only a downlink path. For example, FIG. 3B illustrates uplink and downlink paths 348' and 349', respectively, along the main signal path 344 between the RF ASIC 342 and one of the first and second antennas 210, 220. In contrast, only the downlink path 357' is along the diversity signal path 347 between the RF ASIC 342 and one of the first and second antennas 210, 220. Accordingly, although each of the main signal path 344 and the diversity signal path 347 may include one or more Low Noise Amplifiers (LNAs) 349, 357, respectively, the main signal path 344 may additionally include one or more Power Amplifiers (PAs) 348, whereas PAs may be absent from the diversity signal path 347. Moreover, a Received Signal Strength Indication (RSSI) comparator circuit 367 may be configured to compare the strength of downlink signals (e.g., downlink signals received at different times) along the downlink path 349'. Additionally or alternatively, the RSSI comparator circuit 367 may be configured to compare the strength of a downlink signal along the downlink path 349' with the strength of a downlink signal along the downlink path 357'. Although the circuit 367 is described in terms of RSSI comparison, it will be understood that the circuit 367 may additionally or alternatively be used to measure other indicators of antenna performance/signal strength. For example, the circuit 367 may be used to measure one or more of any of the performance characteristics described herein.

Figure 4:
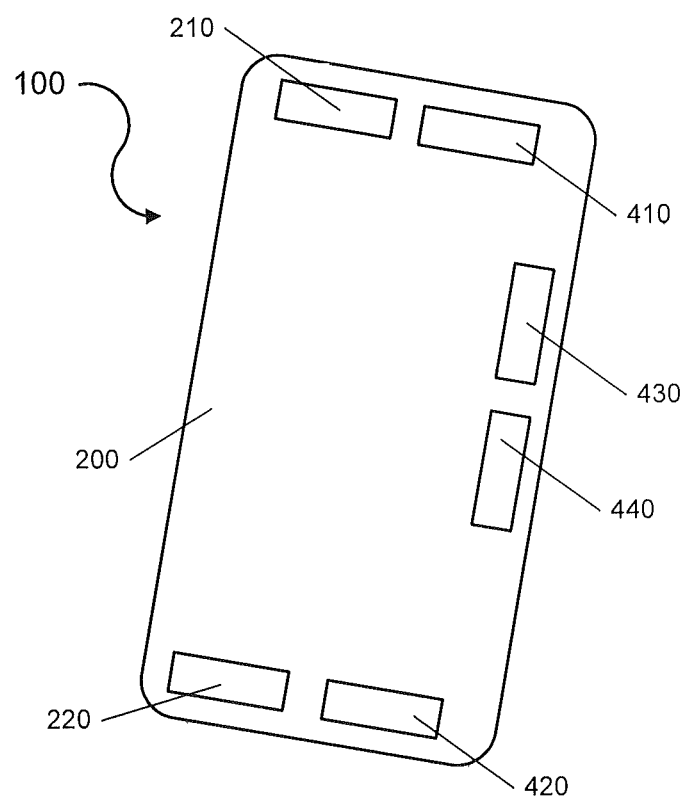
FIG. 4 illustrates a wireless electronic device including several possible antenna combinations, according to various embodiments of the present inventive concepts.

Referring now to FIG. 4, a wireless electronic device 100 including several possible antenna combinations is illustrated, according to various embodiments of the present inventive concept. In particular, FIG. 4 illustrates third and fourth antennas 410, 420, in addition to the first and second antennas 210, 220. Moreover, FIG. 4 illustrates that one or more antennas (e.g., side antennas 430, 440, which may be notch/slot antennas, among other configurations) may be located at a side portion (as opposed to a top or bottom portion) of the wireless electronic device 100. Furthermore, although six (6) antennas are illustrated in FIG. 4, it will be understood that the third and/or fourth antennas 410, 420 may be located at a side portion of the wireless electronic device 100 rather than the side antennas 430, 440. In other words, the wireless electronic device 100 may include three (3) or four (4) antennas, each of which may be located anywhere along the periphery of the wireless electronic device 100.

Each of the antennas 210, 220, 410, 420, 430, and 440 may be multi-band antennas. Additionally, the antennas 210, 220, 410, 420, 430, and 440 may be ones of various antennas configured for wireless communications. For example, each of the antennas 210, 220, 410, 420, 430, and 440 may be a monopole antenna or a planar inverted-F antenna (PIFA), among others. Additionally, each of the antennas 210, 220, 410, 420, 430, and 440 may be a multi-band antenna and/or may be configured to communicate cellular and/or non-cellular frequencies. Moreover, each of the antennas 210, 220, 410, 420, 430, and 440 may be a multi-band antenna included within the multi-band antenna system 346 illustrated in FIG. 3A. Furthermore, according to various embodiments, each of the antennas 210, 220, 410, 420, 430, and 440 may be designed to cover all frequency bands of interest to the wireless electronic device 100, and each may be configured to transmit at full power.

It will be understood by those skilled in the art that a controller (e.g., the processor 351 and/or another controller) may be configured to control the components of the wireless electronic device 100. For example, the controller may be configured to command the multiplexer 340 to select (e.g., to swap to) the second antenna 220 for active transmission and/or reception of signals with respect to the network 110.

Moreover, the controller of the wireless electronic device 100 may use an antenna swapping algorithm to provide commands to the multiplexer 340. The antenna swapping algorithm may be controlled/performed by at least one of the RF ASIC 342, the processor 351, and another processor/ASIC. Additionally, the antenna swapping algorithm may be stored in the memory 353, the RF ASIC 342, and/or another non-transitory storage medium within the wireless electronic device 100. For example, the RF ASIC 342 may provide signal quality measurement values for antennas in the multi-band antenna system 346 to the antenna swapping algorithm, which may then provide an output that commands the multiplexer 340 to select a particular antenna for active transmission and/or reception of signals with respect to the network 110.

In particular, the antenna swapping algorithm may include an algorithm for operations illustrated in one or more of the flowcharts of FIGS. 5A-5D. For example, the antenna swapping algorithm may determine that one of the first and second antennas 210, 220 (or one of any combination/pair of the antennas illustrated in FIG. 4) has a better/stronger performance, and may command the multiplexer 340 to swap once between the first and second antennas 210, 220 to use the better/stronger antenna. Moreover, before the one-time swap, the antenna swapping algorithm may control repeated swapping between the first and second antennas 210, 220 to measure performance during a time period of repeated swapping. In some embodiments, the antenna swapping algorithm may include saving/accessing a performance measurement of the active antenna that was used by the wireless electronic device 100 before repeatedly swapping the antennas 210, 220.

Figure 5A:
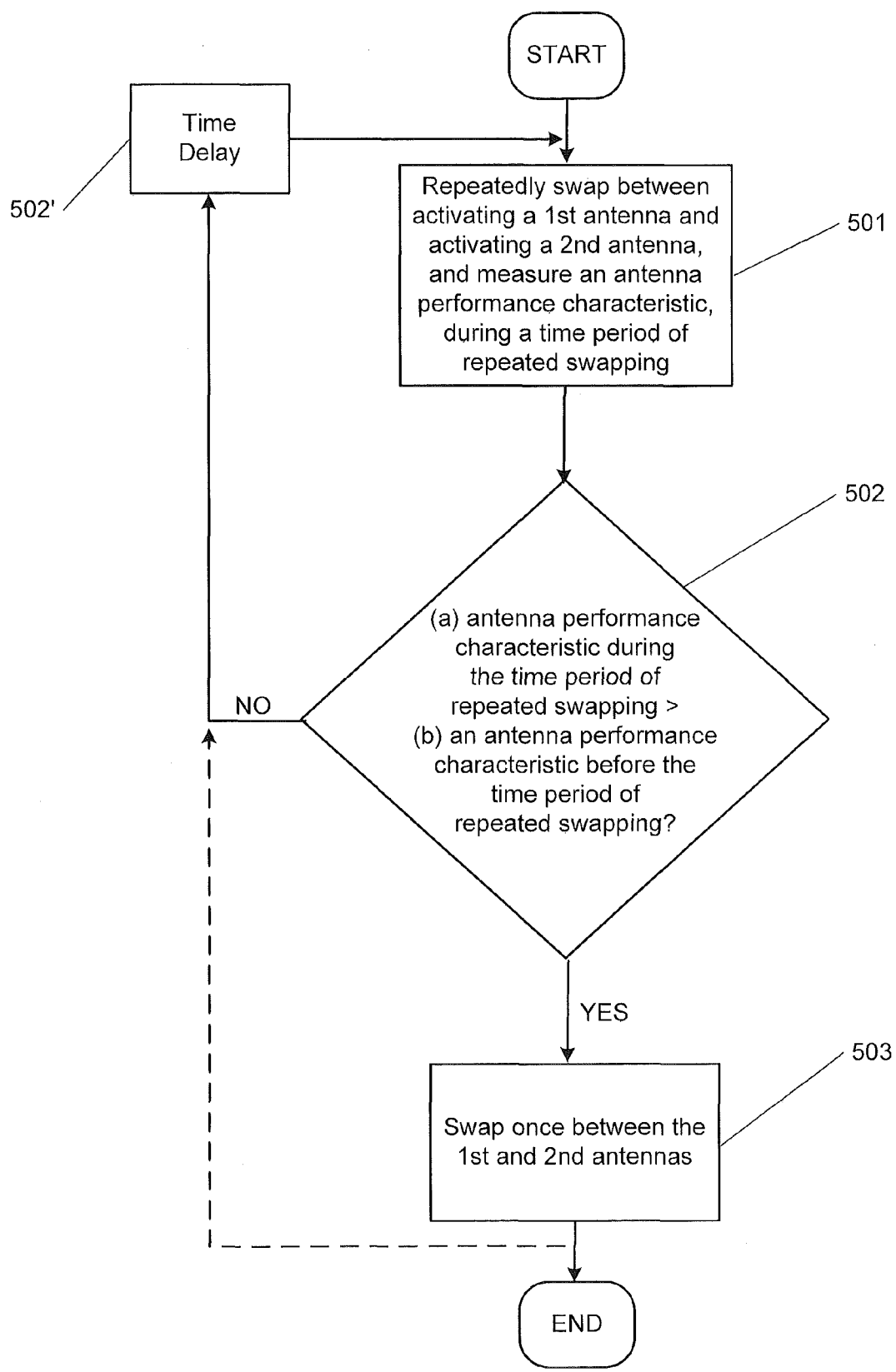
FIGS. 5A-5D are flowcharts illustrating antenna swapping operations, according to various embodiments of the present inventive concepts.

Referring now to FIGS. 5A-5D, flowcharts are provided illustrating antenna swapping operations, according to various embodiments of the present inventive concepts. Referring specifically to FIG. 5A, the operations include using the processor 351 of FIG. 3A, and/or other control circuitry in the wireless electronic device 100, and the antenna swapping circuitry 341 of FIG. 3B to repeatedly alternate/swap back and forth between activating a first antenna (e.g., the antenna 210) and activating a second antenna (e.g., the antenna 220) during a time period of repeated swapping (Block 501). The wireless electronic device 100 may measure an antenna performance characteristic of the wireless electronic device 100 during the time period of repeated swapping. The time period of repeated swapping in Block 501 may be in a range from about one hundred (100.0) milliseconds (ms) to about two (2.0) seconds, which should be long enough to determine whether antenna performance has increased or decreased. The performance characteristic may be one of such parameters as received signal strength, antenna input impedance, received signal-to-noise ratio (SNR), or other quality measurements, such as other signal quality properties or radio channel propagation properties. As will be understood by those skilled in the art, these parameters may be sensed by various sensors in the wireless electronic device 100.

The operations may also include comparing (a) the antenna performance characteristic of the wireless electronic device 100 during the time period of repeated swapping and (b) an antenna performance characteristic of the wireless electronic device 100 before the time period of repeated swapping (Block 502). As an example, the wireless electronic device 100 may detect weak signal conditions (e.g., 2 G/SISO conditions) when the first antenna is active (e.g., is using the main signal path 344 of FIG. 3B), and the wireless electronic device 100 may measure antenna performance characteristics both (a) during and (b) before repeatedly swapping between the first and second antennas 210, 220. Furthermore, the wireless electronic device 100 may save (e.g., in the memory 353 or the RF ASIC 342 of FIG. 3A) the performance characteristic of the antenna that was active immediately before the repeated swapping in Block 501.

Referring still to FIG. 5A, the operations may include, in response to determining that the antenna performance characteristic of the wireless electronic device 100 during the time period of repeated swapping is stronger than the antenna performance characteristic of the wireless electronic device 100 before the time period of repeated swapping, swapping once between the first and second antennas 210, 220 (Block 503). Alternatively, if the antenna performance characteristic of the wireless electronic device 100 during the time period of repeated swapping is weaker than, or is the same as, the antenna performance characteristic of the wireless electronic device 100 before the time period of repeated swapping, then the wireless electronic device 100 may continue using the antenna that was active immediately before the repeated swapping in Block 501 and may wait/delay for a given time period before returning to Block 501's operations of repeatedly swapping and measuring performance (Block 502').

The time delay of Block 502' may be in a range from about five (5.0) seconds to about ten (10.0) seconds if the first and second antennas 210, 220 are closely-located on the wireless electronic device 100, because small changes in a user's hand position on the wireless electronic device 100 may significantly change antenna performance when antennas are closely located. Alternatively, if the first and second antennas 210, 220 are farther apart, then the time delay of Block 502' may be larger (e.g., thirty (30.0) seconds or greater) because antenna conditions are less likely to have changed. Moreover, in some embodiments, the wireless electronic device 100 may continue the operations illustrated in FIG. 5A indefinitely by proceeding to the time delay (Block 502') even after swapping between the first and second antennas 210, 220 in Block 503. It will be understood that one of the first and second antennas 210, 220 is used continuously during the time delay in Block 502'. Moreover, it will be understood that the repeated swapping in Block 501 includes a plurality of swaps for antenna evaluation purposes during the time period of repeated swapping and is more temporary than the single swap in Block 503.

Figure 5B:
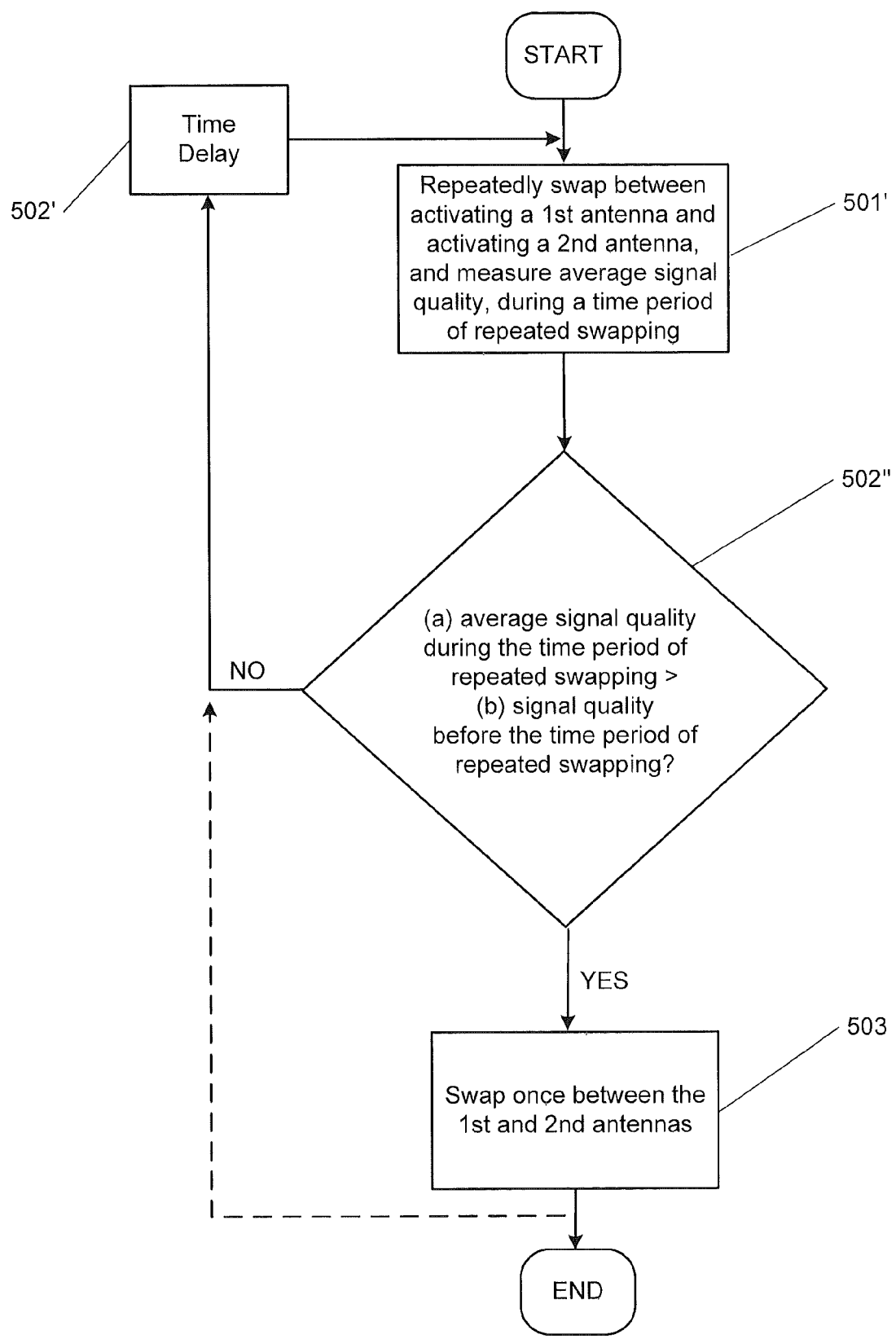

Referring to FIG. 5B, the operations include Blocks 503 and 502' of FIG. 5A and further include Blocks 501' and 502", which are modifications of FIG. 5A's Block 501 and 502, respectively. In particular, Block 501' of FIG. 5B indicates that the antenna performance characteristic may be a measurement of average signal quality of the wireless electronic device 100 during the time period of repeated swapping. In particular, the measurement is an average of (i) signal quality when the first antenna 210 is active during the time period of repeated swapping and (ii) signal quality when the second antenna 220 is active during the time period of repeated swapping. Accordingly, about half of the average may be attributed to the first antenna 210, and about half of the average may be attributed to the second antenna 220.

Also, Block 502" indicates comparing (a) the average signal quality measured in Block 501' and (b) the signal quality using one of the first and second antennas 210, 220 before the repeated swapping in Block 501'. Moreover, it will be understood that the signal quality measurement of the wireless electronic device 100 before the time period of repeated swapping in Block 501' may include a stored value of signal quality of the one of the first and second antennas 210, 220 that was active (e.g., that was using the main signal path 344 of FIG. 3B) immediately before the repeated swapping.

Accordingly, a performance characteristic may include an average/combination of performances of multiple antennas (e.g., the first and second antennas 210, 220) during the time period of repeated swapping. Alternatively, performance of one of the antennas 210, 220 may be ignored during the time period of repeated swapping. For example, if the wireless electronic device 100 was actively using the first antenna 210 immediately before the time period of repeated swapping, then the wireless electronic device 100 may measure a performance characteristic of the second antenna 220 while ignoring the performance of the first antenna 210 during the time period of repeatedly swapping between the first and second antennas 210, 220. A signal (e.g., a data signal) transmitted or received using the first antenna 210 during the time period of repeated swapping, however, may be combined with a signal transmitted or received using the second antenna 220 during the time period of repeated swapping, and vice versa, such that an especially weak performance by one of the first and second antennas 210, 220 should not drop a connection between the wireless electronic device 100 and the network 110.

Figure 5C:
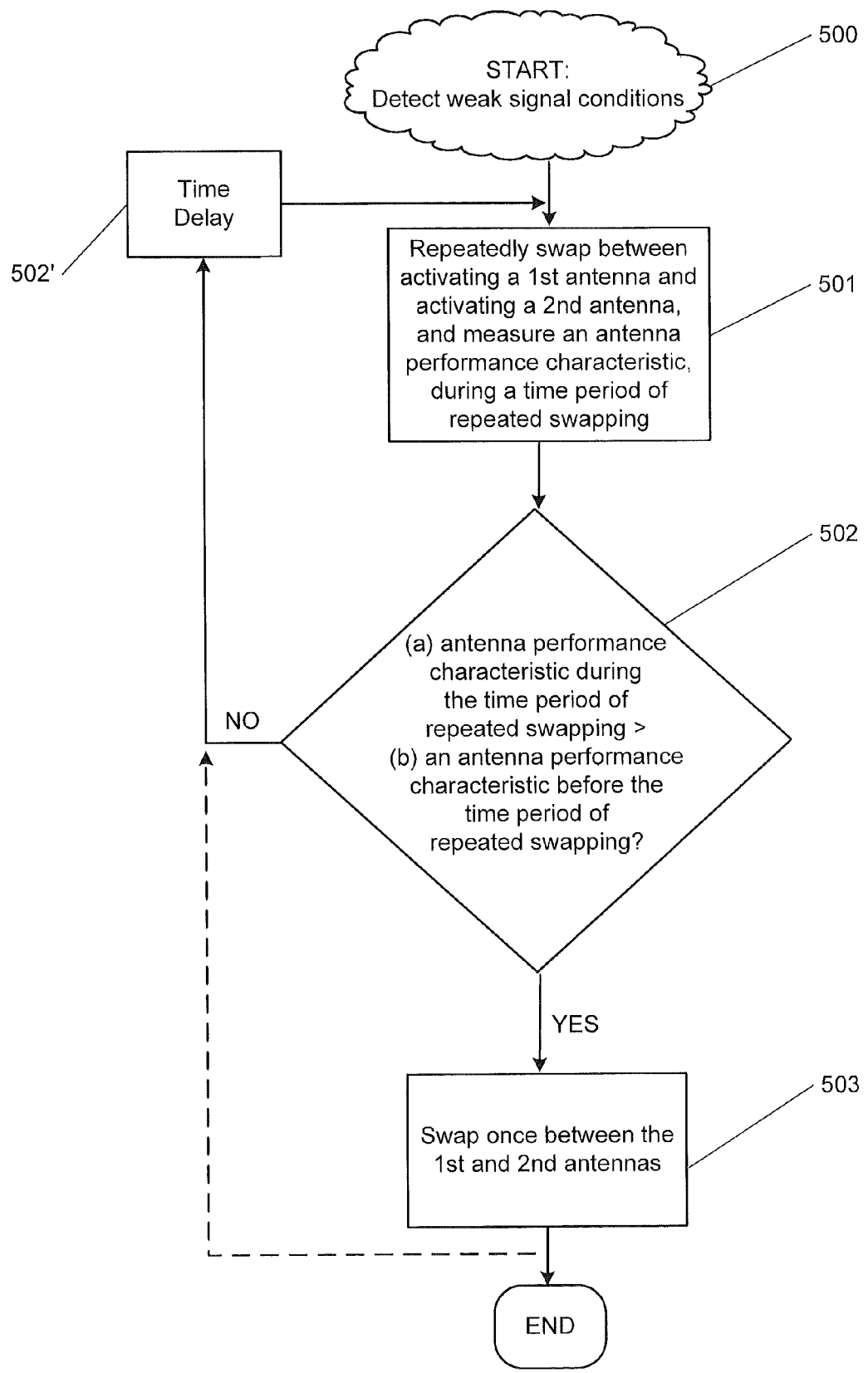

Referring to FIG. 5C, the operations include Blocks 501-503 of FIG. 5A and further include Block 500. Block 500 indicates that the repeated swapping in Block 501 may be responsive to detecting weak signal conditions. For example, repeatedly swapping back and forth between activating the first antenna 210 and activating the second antenna 220 may include repeatedly swapping back and forth between activating the first antenna 210 and activating the second antenna 220 in response to detecting the weak signal conditions.

Figure 5D:
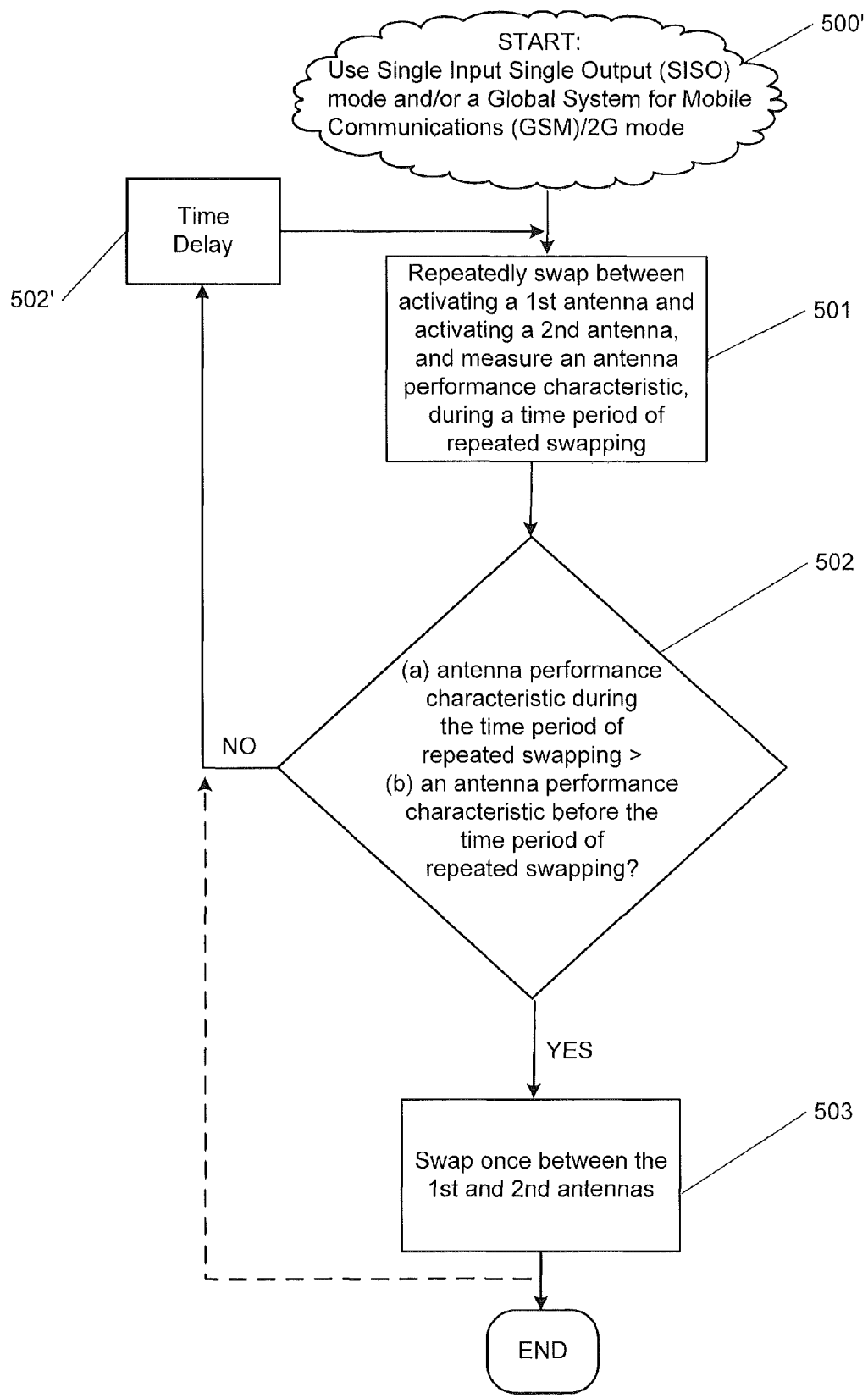

Referring to FIG. 5D, the operations include Blocks 501-503 of FIG. 5C and further include Block 500', which is a modification of Block 500 of FIG. 5C. In particular, Block 500' indicates that the repeated swapping in Block 501 may be responsive to detecting and/or using a SISO mode and/or 2 G/GSM mode/network for communications of the wireless electronic device 100. It will be understood that detecting and/or using the SISO mode and/or 2 G/GSM mode/network may occur shortly after powering-on the wireless electronic device 100 or may be responsive to degraded antenna performance after the wireless electronic device 100 uses a faster mode/network.

Figure 6A:
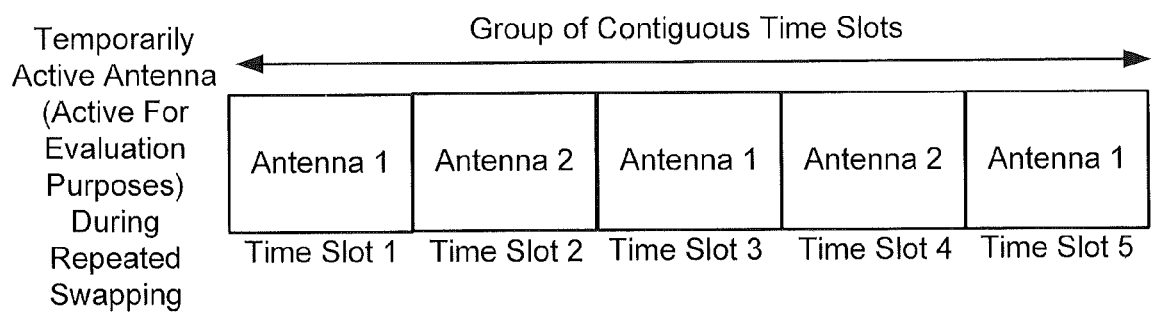
FIGS. 6A and 6B are diagrams illustrating antenna swapping operations during a group of contiguous time slots, according to various embodiments of the present inventive concepts.
Figure 6B:
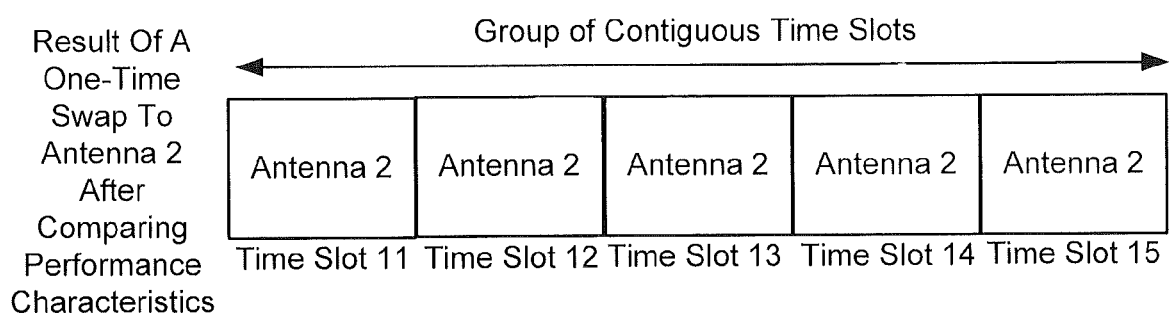

Referring now to FIGS. 6A and 6B, diagrams are provided illustrating antenna swapping operations during a group of contiguous time slots, according to various embodiments of the present inventive concepts. Referring specifically to FIG. 6A, an example of the repeated swapping in Block 501 of FIG. 5A is illustrated. In particular, FIG. 6A illustrates that, during the repeated swapping, only one of the first and second antennas 210, 220 is active within a given time slot. For example, only one of the first and second antennas 210, 220 may be connected to the main signal path 344 of FIG. 3B by the multiplexer 340 within a given time slot.

Moreover, the wireless electronic device 100 may use the multiplexer 340 to alternate between activating the first antenna 210 and activating the second antenna 220, such that the first and second antennas 210, 220 are alternately active during adjacent time slots, respectively. For example, FIG. 6A illustrates that the first antenna 210 may be active during the first, third, and fifth time slots, and the second antenna 220 may be active during the second and fourth time slots. It will be understood that the use of time slots may indicate that the wireless electronic device 100 is receiving/processing signals using a Time-Division Multiplexing (TDM) system/protocol and/or a Time Division Multiple Access (TDMA) system/protocol. Also, because the wireless electronic device 100 is repeatedly alternating between the first and second antennas 210, 220, even if one of the first and second antennas 210, 220 receives no signal at all, the total signal loss during the time period of repeated swapping may only be about half of the signal that was provided before the repeated swapping. Specifically, the total signal drop if one of the first and second antennas 210, 220 receives no signal at all may only be about three (3.0) decibels (dB) because the wireless electronic device 100 is repeatedly alternating between the first and second antennas 210, 220. The operations of repeated swapping described herein may therefore reduce lost communications connections and/or dropped phone calls.

Although FIG. 6A illustrates five (5) time slots to provide an example of repeated swapping, it will be understood that more or fewer time slots may be used during the repeated swapping, and that an odd or an even number of time slots may be used. Moreover, it will be understood that the time slots are contiguous time slots, and that the alternately active first and second antennas 210, 220 are temporarily active for evaluation purposes during the contiguous time slots. In particular, as described herein, the total time period of repeated swapping (e.g., including the entire group of contiguous time slots) is in a range from about 100.0 ms to about 2.0 s.

In some embodiments, a swap between the first and second antennas 210, 220 during the time period of repeated swapping may be triggered responsive to receipt of a signal from the network 110 (e.g., from the base station 130a) indicating the start of a next time slot (e.g., a next one of the time slots in FIG. 6A). Additionally or alternatively, it will be understood that the repeated swapping illustrated in FIG. 6A may occur during one or more time slots that are not allocated/assigned to the wireless electronic device 100 for communications with the network 110. Performing the repeated swapping during such non-communications-allocated time slots may help to reduce/prevent lost data from the network 110 to the wireless electronic device 100 during the time period of repeated swapping.

Moreover, although a performance characteristic measured during the time period of repeated swapping may represent a measurement of antenna performance in all time slots that occur during the time period of repeated swapping, it will be understood that the performance characteristic may alternatively be a measurement (e.g., an average and/or comparison) of any sub-combination of the time slots during the time period of repeated swapping. For example, the antenna performance characteristic during the time period of repeated swapping may simply be an average/comparison between (a) performance of the first antenna 210 during the third time slot of FIG. 6A and (b) performance of the second antenna 220 during the second time slot. Moreover, in some embodiments, performance characteristic calculations may compensate for performance changes over time by more heavily weighting (i.e., assigning greater influence on the resulting performance characteristic) more recent measurements than less recent measurements. For example, the performance of the first antenna 210 during the fifth time slot of FIG. 6A may be weighted more heavily than the performance of the first antenna 210 during the first and/or third time slots of FIG. 6A when calculating a performance characteristic.

Referring to FIG. 6B, an example of the single swap in Block 503 of FIG. 5A is illustrated. In contrast with the repeated swapping for evaluation purposes in FIG. 6A, FIG. 6B illustrates the result of a single, one-time swap from one of the antennas 210, 220 to the other. The swap in FIG. 6B is referred to as a single, one-time swap because the wireless electronic device 100 maintains a particular one of the antennas 210, 220 as the active antenna continuously for many contiguous time slots. Specifically, the wireless electronic device 100 may maintain a particular one of the antennas 210, 220 as the active antenna either indefinitely or throughout the time delay 502' of FIG. 5A, which, as described herein, may be at least about 5.0 seconds. In the example illustrated in FIG. 6B, the wireless electronic device 100 has performed a one-time swap to the second antenna 220 after comparing (a) the antenna performance characteristic during the time period of repeated swapping and (b) the antenna performance characteristic before the time period of repeated swapping. In particular, FIG. 6B illustrates that the second antenna 220 is continuously maintained as the active antenna through several contiguous time slots.

Figure 7A:
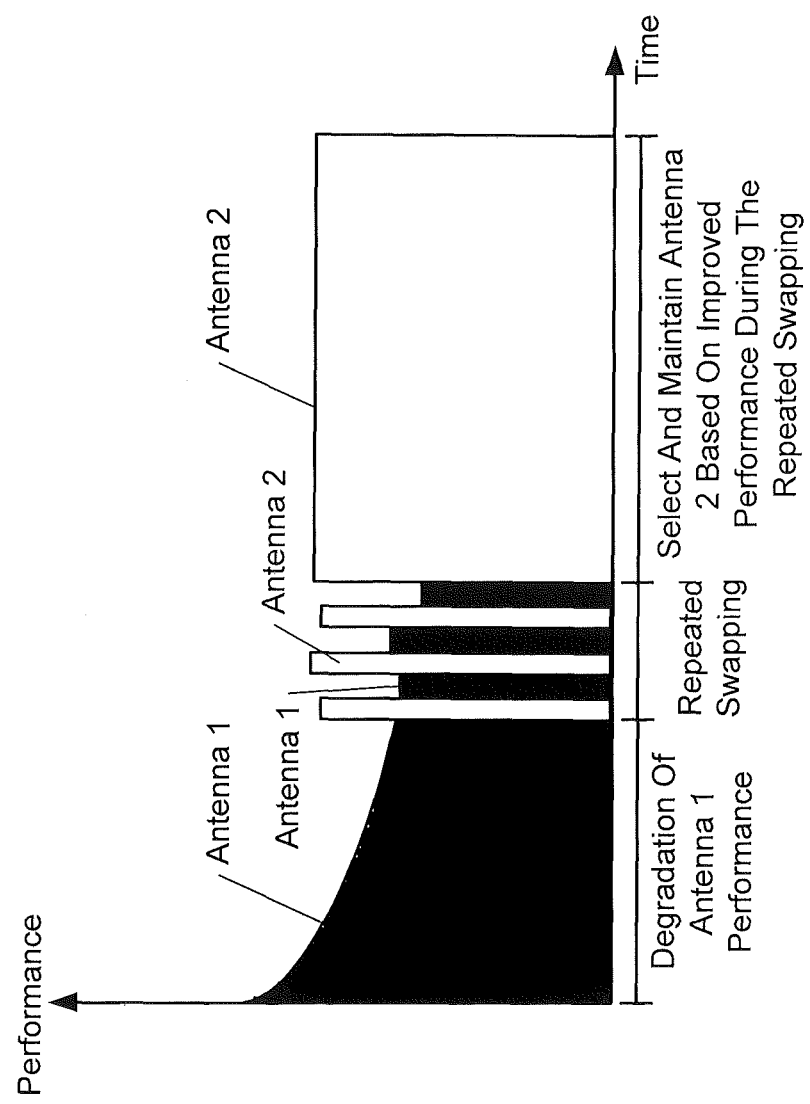
FIGS. 7A and 7B are graphs illustrating antenna performance levels during antenna swapping operations, according to various embodiments of the present inventive concepts.
Figure 7B:
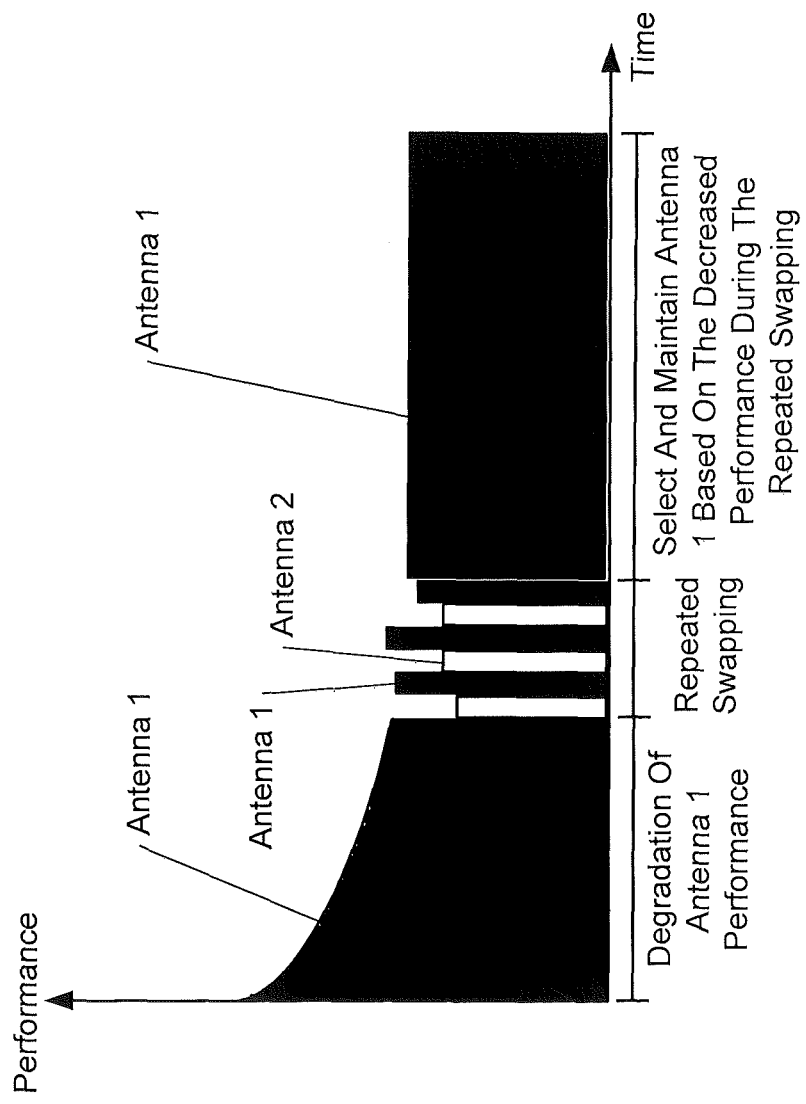

Referring now to FIGS. 7A and 7B, graphs are provided illustrating antenna performance levels during antenna swapping operations, according to various embodiments of the present inventive concepts. Referring specifically to FIG. 7A, an example is illustrated in which antenna performance of the wireless electronic device 100 improves during a time period of repeated swapping (e.g., during the contiguous time slots of FIG. 6A). As illustrated in FIG. 7A, weak signal conditions (e.g., as indicated by degraded performance of the first antenna 210) may trigger repeated swapping between the first and second antennas 210, 220. The wireless electronic device 100 may measure the average antenna performance of the combination of the alternating first and second antennas 210, 220 during the time period of repeated swapping. If the average antenna performance during the time period of repeated swapping indicates improved performance in comparison with the weak signal conditions, then the wireless electronic device 100 will perform a single swap (e.g., as illustrated in Block 503 of FIG. 5A) to select and maintain the second antenna 220. In particular, if the first antenna 210 was providing weak performance before (e.g., immediately before) the repeated swapping, and if the average antenna performance during the time period of repeated swapping is greater than the performance of the first antenna 210 before (e.g., immediately before) the repeated swapping, then the performance of the second antenna 220 is stronger than the performance of the first antenna 210 because the performance of the second antenna 220 is lifting the average. Accordingly, the wireless electronic device 100 will select and maintain the second antenna 220 continuously for a plurality of contiguous time slots (e.g., as illustrated in FIG. 6B) after the time period of repeated swapping.

Alternatively, referring to FIG. 7B, if the average antenna performance during the time period of repeated swapping indicates decreased performance in comparison with the weak signal conditions, then the wireless electronic device 100 will maintain the antenna that was active before the repeated swapping began. For example, FIG. 7B illustrates that although weak signal conditions when the first antenna 210 was active triggered a time period of repeated swapping, the performance of the second antenna 220 was even weaker than that of the first antenna 210. In particular, as the performance of the second antenna 220 during the time period of repeated swapping was weaker than the performance of the first antenna 210, an overall average antenna performance during the time period of repeated swapping would be lower than the performance of the first antenna 210 before the time period of repeated swapping. Accordingly, as the average antenna performance during the time period of repeated swapping indicated a decrease in performance because of the alternating combination of the first and second antennas 210, 220, the wireless electronic device 100 will select and maintain the first antenna 210 continuously for a plurality of contiguous time slots after the time period of repeated swapping.

The wireless electronic device 100 may therefore use the operations of temporary repeated swapping described herein to efficiently determine whether to more permanently swap to a particular antenna.

Many different embodiments have been disclosed herein, in connection with the above description and the drawings. It will be understood that it would be unduly repetitious and obfuscating to literally describe and illustrate every combination and subcombination of these embodiments. Accordingly, the present specification, including the drawings, shall be construed to constitute a complete written description of all combinations and subcombinations of the embodiments described herein, and of the manner and process of making and using them, and shall support claims to any such combination or subcombination.

In the drawings and specification, there have been disclosed various embodiments and, although specific terms are employed, they are used in a generic and descriptive sense only and not for purposes of limitation.

What is claimed is:

1. An antenna swapping method for a wireless electronic device, comprising:

repeatedly swapping back and forth between activating a first antenna and activating a second antenna, and measuring a first antenna performance characteristic of the wireless electronic device, during a time period of repeated swapping;

comparing the first antenna performance characteristic of the wireless electronic device measured during the time period of repeated swapping and a second antenna performance characteristic of the wireless electronic device measured before the time period of repeated swapping; and in response to determining that the first antenna performance characteristic of the wireless electronic device measured during the time period of repeated swapping is stronger than the second antenna performance characteristic of the wireless electronic device measured before the time period of repeated swapping, swapping once between the first and second antennas.

2. The method of claim 1, wherein repeatedly swapping back and forth between activating the first antenna and activating the second antenna comprises a plurality of swaps for antenna evaluation purposes during the time period of repeated swapping and is more temporary than the swapping once.

3. The method of claim 2, wherein repeatedly swapping back and forth between activating the first antenna and activating the second antenna comprises continuously swapping back and forth between activating the first antenna and activating the second antenna during the time period of repeated swapping such that the first and second antennas are alternately active within adjacent time slots, respectively.

4. The method of claim 3, wherein the swapping once comprises swapping between the first and second antennas to maintain one of the first and second antennas as an active antenna continuously for a plurality of contiguous time slots.

5. The method of claim 1, wherein repeatedly swapping back and forth between activating the first antenna and activating the second antenna comprises repeatedly swapping back and forth between activating the first antenna and activating the second antenna in response to detecting weak signal conditions.

6. The method of claim 5, wherein detecting the weak signal conditions comprises detecting and/or using a Single Input Single Output (SISO) mode and/or a Global System for Mobile Communications (GSM)/2G mode for communications of the wireless electronic device.

7. The method of claim 6, wherein:
the wireless electronic device comprises a main signal path comprising uplink and downlink signal paths that are configured for transmissions through the first and second antennas, and a diversity signal path that configured is for downlink signals only;
communications using the diversity signal path are disabled in response to the SISO mode and/or the GSM/2G mode; and
repeatedly swapping back and forth between activating the first antenna and activating the second antenna comprises repeatedly swapping back and forth between connecting the first antenna to the main signal path, together with disconnecting the second antenna from the main signal path, and connecting the second antenna to the main signal path, together with disconnecting the first antenna from the main signal path.

8. The method of claim 1, wherein comparing the first antenna performance characteristic of the wireless electronic device measured during the time period of repeated swapping and the second antenna performance characteristic of the wireless electronic device measured before the time period of repeated swapping comprises comparing a signal quality measurement of the wireless electronic device during the time period of repeated swapping and a signal quality measurement of the wireless electronic device before the time period of repeated swapping.

9. The method of claim 8, wherein:
the signal quality measurement of the wireless electronic device during the time period of repeated swapping comprises an average of signal quality when the first antenna is active and signal quality when the second antenna is active; and
the signal quality measurement of the wireless electronic device before the time period of repeated swapping comprises a stored value of signal quality of the one of the first and second antennas that was active immediately before repeatedly swapping back and forth between activating the first antenna and activating the second antenna.

10. The method of claim 8, wherein:
the signal quality measurement of the wireless electronic device during the time period of repeated swapping comprises a measurement that ignores the signal quality of the one of the first and second antennas that was active immediately before repeatedly swapping back and forth between activating the first antenna and activating the second antenna; and
the signal quality measurement of the wireless electronic device before the time period of repeated swapping comprises a stored value of signal quality of the one of the first and second antennas that was active immediately before repeatedly swapping back and forth between activating the first antenna and activating the second antenna.

11. A wireless electronic device, comprising:
first and second antennas connected to a multi-band transceiver circuit configured to provide communications for the wireless electronic device via a plurality of frequency bands, the first and second antennas being configured to connect to the multi-band transceiver circuit via main and diversity signal paths; and
a controller configured to:
control repeatedly swapping back and forth between activating the first antenna and activating the second antenna, and control measuring a first antenna performance characteristic of the wireless electronic device, during a time period of repeated swapping;
compare the first antenna performance characteristic of the wireless electronic device measured during the time period of repeated swapping and a second antenna performance characteristic of the wireless electronic device measured before the time period of repeated swapping; and
control swapping once between the first and second antennas in response to determining that the first antenna performance characteristic of the wireless electronic device measured during the time period of repeated swapping is stronger than the second antenna performance characteristic of the wireless electronic device measured before the time period of repeated swapping.

12. The wireless electronic device of claim 11, wherein the main signal path provides a path for both uplink and downlink signals, whereas the diversity signal path provides a path for downlink signals only.

13. The wireless electronic device of claim 11, wherein the first and second antennas comprise redundant antennas with respect to each other for the main signal path.

14. The wireless electronic device of claim 11, wherein the controller is configured to command a multiplexer connected between the main and diversity signal paths and the first and second antennas to switch which of the first and second antennas is connected to the main signal path.

15. The wireless electronic device of claim 14, wherein:
the wireless electronic device comprises a non-transitory storage medium that stores an antenna swapping algorithm;
the controller is configured to control input of the first antenna performance characteristic of the wireless electronic device measured during the time period of repeated swapping and the second antenna performance characteristic of the wireless electronic device measured before the time period of repeated swapping into the antenna swapping algorithm; and the controller is further configured to control input of an output of the antenna swapping algorithm into the multiplexer to switch which of the first and second antennas is connected to the main signal path.

16. The wireless electronic device of claim 15, further comprising:

a third antenna connected to the multiplexer, wherein:

the controller is configured to command the multiplexer to connect one of the first, second, and third antennas to the main signal path; and the controller is configured to command the multiplexer to disconnect another one of the first, second, and third antennas from the main signal path.

17. The wireless electronic device of claim 11, wherein:

repeatedly swapping back and forth between activating the first antenna and activating the second antenna comprises continuously swapping back and forth between activating the first antenna and activating the second antenna during the time period of repeated swapping such that the first and second antennas are alternately active within adjacent time slots, respectively;

the swapping once comprises swapping between the first and second antennas to maintain one of the first and second antennas as an active antenna continuously for a plurality of contiguous time slots;

the time period of repeated swapping comprises a time period ranging from about 100.0 milliseconds to about 2.0 seconds; and the controller is configured to maintain the one of the first and second antennas after the swapping once for at least about 5.0 seconds.

18. The wireless electronic device of claim 11, wherein repeatedly swapping back and forth between activating the first antenna and activating the second antenna comprises repeatedly swapping back and forth between activating the first antenna and activating the second antenna in response to detecting weak signal conditions.

19. The wireless electronic device of claim 18, wherein detecting the weak signal conditions comprises detecting and/or using a Single Input Single Output (SISO) mode and/or using a Global System for Mobile Communications (GSM)/2G mode for communications of the wireless electronic device.

20. An antenna swapping method for a wireless electronic device having multiple radio frequency signal paths, the method comprising:

using an algorithm to continuously and repeatedly swap back and forth between activating a first antenna and activating a second antenna, by transmitting and/or receiving signals using one of the radio frequency signal paths, during a time period of repeated swapping such that the first and second antennas are alternately active within adjacent time slots, respectively, to measure a first performance of at least one of the first and second antennas;

comparing the first performance measured during the time period of repeated swapping with a second performance of at least one of the first and second antennas measured before the time period of repeated swapping; and after the time period of repeated swapping, activating a better-performing one of the first and second antennas for a time period that is longer than the time period of repeated swapping.

21. The method of claim 20, wherein the adjacent time slots comprise contiguous time slots, wherein using the algorithm to continuously and repeatedly swap back and forth comprises using the algorithm to continuously and repeatedly swap back and forth between activating the first antenna and activating the second antenna, during the time period of repeated swapping such that the first and second antennas are alternately active within the contiguous time slots, respectively, and wherein the time period of repeated swapping comprises a time period ranging from about 100.0 milliseconds to about 2.0 seconds.

* * * * *